US012086309B2

(12) United States Patent
Toivanen et al.

(10) Patent No.: US 12,086,309 B2
(45) Date of Patent: Sep. 10, 2024

(54) GAZE TRACKING (71) Applicant: SeeTrue Technologies Oy, Joensuu (FI)

(72) Inventors: Miika Toivanen, Joensuu (FI); Kristian Lukander, Joensuu (FI); Roman Bednarik, Joensuu (FI); Piotr Bartczak, Joensuu (FI)

(73) Assignee: SeeTrue Technologies Oy, Joensuu (FI)

( * ) Notice: Subject to any disclaimer, the term of this patent is extended or adjusted under 35 U.S.C. 154(b) by 19 days.

(21) Appl. No.: 17/801,277

(22) PCT Filed: Feb. 12, 2021

(86) PCT No.: PCT/FI2021/050098
§ 371 (c)(1),
(2) Date: Aug. 22, 2022

(87) PCT Pub. No.: WO2021/165570
PCT Pub. Date: Aug. 26, 2021

(65) Prior Publication Data
US 2023/0104656 A1    Apr. 6, 2023

(30) Foreign Application Priority Data
Feb. 21, 2020    (FI) .................................... 20205182

(51) Int. Cl.
G06F 3/01        (2006.01)
G02B 27/00       (2006.01)
(Continued)

(52) U.S. Cl.
CPC ......... *G06F 3/013* (2013.01); *G02B 27/0093* (2013.01); *G06T 7/73* (2017.01); *G06T 2207/30196* (2013.01); *H04N 23/56* (2023.01)

(58) Field of Classification Search
CPC . G06F 3/013; G06T 7/73; G06T 2207/30196; G02B 27/0093
See application file for complete search history.

(56) References Cited

U.S. PATENT DOCUMENTS 6,005,710 A    12/1999 Pensel et al.
10,698,204 B1 *  6/2020 Ouderkirk ............ G02B 27/141
(Continued)

FOREIGN PATENT DOCUMENTS

CA    2750287 A1    8/2011
CN    110441901 A   11/2019
(Continued)

OTHER PUBLICATIONS

Wikipedia: Eye tracking. Feb. 14, 2020, Retrieved from the Internet: https://en.wikipedia.org/w/index.php?title=Eye tracking&oldid= 940786241.

*Primary Examiner* — Rowina J Cattungal
(74) *Attorney, Agent, or Firm* — Laine IP Oy (57) ABSTRACT According to an example aspect of the present invention, there is provided an apparatus comprising at least one processing core, at least one memory including computer program code, the at least one memory and the computer program code being configured to, with the at least one processing core, cause the apparatus at least to determine a reference point in a three-dimensional space based at least in part on locations of first and second features of a user's eye and on the user's gaze distance, and perform a mapping of the reference point into a viewed scene of a near-to-eye optical device to obtain an estimated gaze point and/or gaze direction of the user who is using the near-to-eye optical device, the mapping being based at least in part on calibration information associated with the user.

10 Claims, 4 Drawing Sheets (51) Int. Cl.
    *G06T 7/73*      (2017.01)
    *H04N 23/56*     (2023.01)

(56) References Cited

U.S. PATENT DOCUMENTS

| | | |
|---|---|---|
| 2013/0300653 A1 | 11/2013 | Lewis et al. |
| 2015/0061995 A1 | 3/2015 | Gustafsson et al. |
| 2016/0210503 A1 | 7/2016 | Yin et al. |
| 2018/0335840 A1 | 11/2018 | Lin |
| 2019/0050664 A1 | 2/2019 | Yang et al. |
| 2021/0088784 A1* | 3/2021 | Whitmire ........... G02B 27/0101 |

FOREIGN PATENT DOCUMENTS

| | | | |
|---|---|---|---|
| EP | 3129849 A1 | 2/2017 | |
| JP | 2006075348 A | 3/2006 | |
| JP | 2017111746 A | 6/2017 | |
| WO | WO2019190561 A1 | 10/2019 | |
| WO | WO-2021026948 A1 * | 2/2021 | ........... G02B 21/241 |

\* cited by examiner

GAZE TRACKING

FIELD

The present disclosure relates to determining a direction and/or target of a user's gaze.

BACKGROUND

Determining what a user looks at is of interest in a number of different fields. For example, a disabled person may be equipped with a gaze tracker enabling her to input characters to form words and sentences. As another example, an ambulance driver may be enabled to safely operate equipment of his ambulance or a nuclear power station operator may have his gaze tracked to detect episodes of fatigue during a shift.

Gaze tracking may be performed based on a number of different techniques, which have as a common feature that the position of one eye, or both eyes, is measured to obtain input information to the gaze tracking system to control a device, for example.

SUMMARY

According to some aspects, there is provided the subject-matter of the independent claims. Some embodiments are defined in the dependent claims.

According to a first aspect of the present disclosure, there is provided an apparatus comprising at least one processing core, at least one memory including computer program code, the at least one memory and the computer program code being configured to, with the at least one processing core, cause the apparatus at least to determine a reference point in a three-dimensional space based at least in part on locations of first and second features of a user's eye and on the user's gaze distance, and perform a mapping of the reference point into a viewed scene of a near-to-eye optical device to obtain an estimated gaze point and/or gaze direction of the user who is using the near-to-eye optical device, the mapping being based at least in part on calibration information associated with the user.

According to a second aspect of the present disclosure, there is provided a method comprising determining a reference point in a three-dimensional space based at least in part on locations of first and second features of a user's eye and on the user's gaze distance, and performing a mapping of the reference point into a viewed scene of a near-to-eye optical device to obtain an estimated gaze point and/or gaze direction of the user who is using the near-to-eye optical device, the mapping being based at least in part on calibration information associated with the user.

According to a third aspect of the present disclosure, there is provided a non-transitory computer readable medium having stored thereon a set of computer readable instructions that, when executed by at least one processor, cause an apparatus to at least determine a reference point in a three-dimensional space based at least in part on locations of first and second features of a user's eye and on the user's gaze distance, and perform a mapping of the reference point into a viewed scene of a near-to-eye optical device to obtain an estimated gaze point and/or gaze direction of the user using the near-to-eye optical device, the mapping being based at least in part on calibration information associated with the user.

EMBODIMENTS

Disclosed herein are gaze tracking methods for near-eye optical devices, such as ocular devices, such as microscopes and binoculars. To obtain dependable gaze tracking in an ocular device which is invariant, at least partly, to movement of the user's head, a reference point is determined in a three-dimensional space based on the direction and distance of the gaze of the user, and the reference point is mapped to a point in viewed scene based on a calibration matrix obtained from the user in a calibration process. Therefore, advantageously, characteristics of a coordinate transformation between a coordinate system of an eye-tracking sensor, such as a camera, and a coordinate system of the user's viewed scene, which may be obtained with a scene camera, for example, need not be determined. The scene viewed may be obtained using various technologies, such as, but not limited to, retinal projection, image projection, image fusion and injection, being displayed or captured with a scene camera as in presented example. Indeed, determining such characteristics could be difficult in a near-to-eye optical devices using plural optical components, such as lenses, filters, beam splitters, light guides and/or mirrors. An example of a near-to-eye optical device is an ocular device, such as a microscope. A desired feature in a gaze tracking method is its invariance against the movement of the eye with respect to the measuring sensor.

Figure 1A:
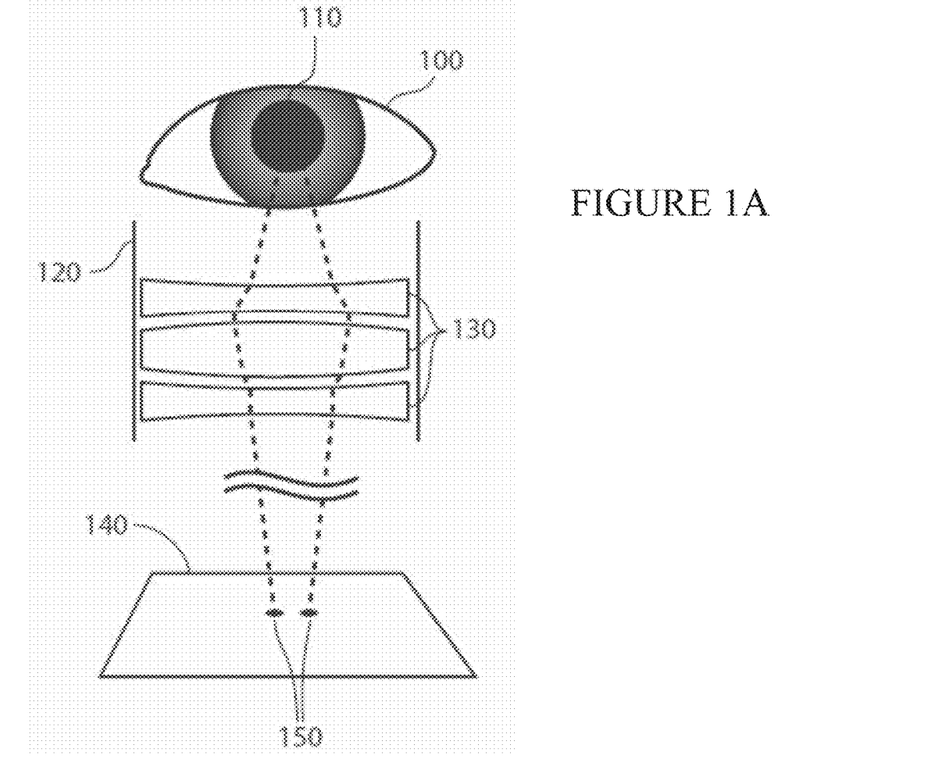
FIG. 1A illustrates an example system in accordance with at least some embodiments of the present invention.

FIG. 1A illustrates an example system in accordance with at least some embodiments of the present invention. Illustrated is a user's eye 100, which comprises the pupil 110. In the illustrated example, the user uses a microscope 120, which is an example of an ocular device or in general a near-to-eye optical device. Microscope 120 comprises a plurality of optical components such as lenses, filters, beam splitters, light guides and/or mirrors, which are schematically illustrated using reference number 130. A sample is visible through the microscope on plate 140. Plate 140 may be of glass, for example, enabling illumination of the sample from below. Two possible gaze targets 150 are schematically illustrated on plate 140.

Tracking the gaze of a user of a microscope gives valuable information concerning how the user observes the sample under study, for example what parts of the sample the user focuses on, for how long and what kind of gaze strategy the user uses. In addition, the pupil size may be estimated. This information may be used to estimate the user's awareness, workload and level of expertise, in educational purposes, and in assisting annotation of image areas. Gaze information may be used in controlling the functioning of an optical device, such as a microscope, for example. Thus manual controlling may be reduced.

A pathologist or laboratory worker may also use his gaze point on a sample plate to guide the microscope to move the sample. As a further example, a digital viewfinder may provide a visual indication when the user is looking at a target which may be a human. Further, a sample may be automatically associated based on the gaze point identification with metadata indicating an extent to which it has been analysed, for example, whether a threshold has been reached. An example is a sample which must be analysed at least as to 70% of its contents.

In the system of FIG. 1A, an eye-tracking camera, which is not shown for the sake of clarity, is configured to image eye 100. The eye-tracking camera may image eye 100 from below, wherein the eye-tracking camera may be comprised in the ocular device being used, for example such that it may image the eye via a semipermeable mirror in the ocular device which is transparent to visible light but not the infra-red. The eye may be illuminated for this purpose by guide lights or light shaping or light generating devices, for example visible-light or infra-red, IR, lights, which may be generated using light-emitting diodes, LEDs, for example. An advantage of IR lights is that the human eye does not detect it, making the light unobtrusive to the user. IR light also allows for filtering out lighting and reflections of visible light sources the user is looking at or are visible in the environment, helping to control the lighting scheme. The corneal shape, illustrated in FIG. 1B, enables extracting information on the direction the eye is turned based on glints of the lights on the moist surface of the eye. The eye-tracking sensor, such as, for example, a camera sensor, which is enabled to capture information of the user's eye may be based at least partly on charge-coupled device, CCD, technology, complementary metal-oxide semiconductor, CMOS, technology, and/or photosensitive photodiodes, for example, to produce a digital video or still data of the eye. Such digital video or still data of the eye may include including reflections, glints, of the guide lights.

Likewise in the system of FIG. 1A, a scene camera—not seen in the figure for the sake of clarity—is arranged to image plate 140. The scene camera may likewise be based on CCD technology, for example, to produce digital video or still data of the sample. The scene camera and the eye-tracking camera may be synchronized with each other to produce time-aligned images of eye 100 and plate 140.

In gaze tracking in general, a transformation may be sought from a 3D coordinate system of an eye-tracking camera to a 3D coordinate system of a scene camera. The eye-tracking camera may be assisted by light-guides to generate glints, as described above, to enable determining a direction where the eye is turned toward. In an ocular device, however, the presence of optical equipment 130 makes it more difficult to project a 3D gaze point into a scene camera's 2D coordinates.

Some gaze tracking solutions are sensitive to movement of the user's head relative to the eye-tracking camera. In these cases, if the user moves after her calibration the gaze-tracking results will be inaccurate. Similarly, if the optical device in question moves during operation, it will result in a similar misalignment error. A typical usage session of an ocular device contains constant small head movements for adjusting the optimal viewing angle, or head movement due to the user leaving the operational position to view objects outside the ocular view and returning to it. The inaccuracy resulting from such head movement hinders gaze tracking. Methods disclosed herein enable robust gaze tracking despite the afore-mentioned unwanted head movements and entering and leaving an operational position.

Much prior work in gaze tracking has used a two-dimensional, 2D, mapping from eye-tracking coordinates to scene camera coordinates which is less robust than a three-dimensional, 3D, algorithm. A 3D approach, however, is complex to implement as such because the projection between the eye-tracking camera coordinate system, where a 3D gaze point may be computed in, and the 2D scene camera coordinate system is non-trivial to determine due to effects of the optical equipment 130.

To overcome the difficulty in defining the transformation from the coordinate system of the eye-tracking camera to the coordinate system of the scene camera, a two-phase gaze tracking method may be employed. In the first phase, data from the eye-tracking camera may be processed to determine a centre of the user's pupil and the centre of the user's cornea. These will be referred to herein as the pupil centre, Pc, and corneal centre, Cc. These may be determined as points in a three-dimensional space, enabling an optical vector L to be determined as a normalized vector traversing these points, establishing a direction of the gaze. An optical point, Op, also referred to herein as a reference point, may be determined by moving from the corneal centre towards the optical vector by the gaze distance d: Op=Cc+d*L. In some embodiments, different 3D features of the eye than the cornea and the pupil are used to compute a 3D optical point relating to the eye. In more general terms a first eye feature and a second eye feature may be used to obtain the optical point. An example of an eye feature other than the cornea and the pupil is the iris, wherefore the first and second eye feature may comprise the iris and the pupil, for example.

The gaze distance may be determined as follows: firstly, a virtual plane may be fitted to light-guide, such as IR LED locations. Secondly, the plane may then be shifted away from the user by a constant value, in the virtual plane's normal direction. The constant value is guessed or it is estimated during the user calibration. Thirdly, an intersection between the shifted plane and the (parameterized) vector Cc+d*L is computed, that is, d is found. Thus the gaze distance may be estimated per measurement and may be at least slightly different each time. Other ways of determining the gaze distance are also possible. The gaze distance is the distance from the eye to where the user's gaze is focused.

Figure 4:
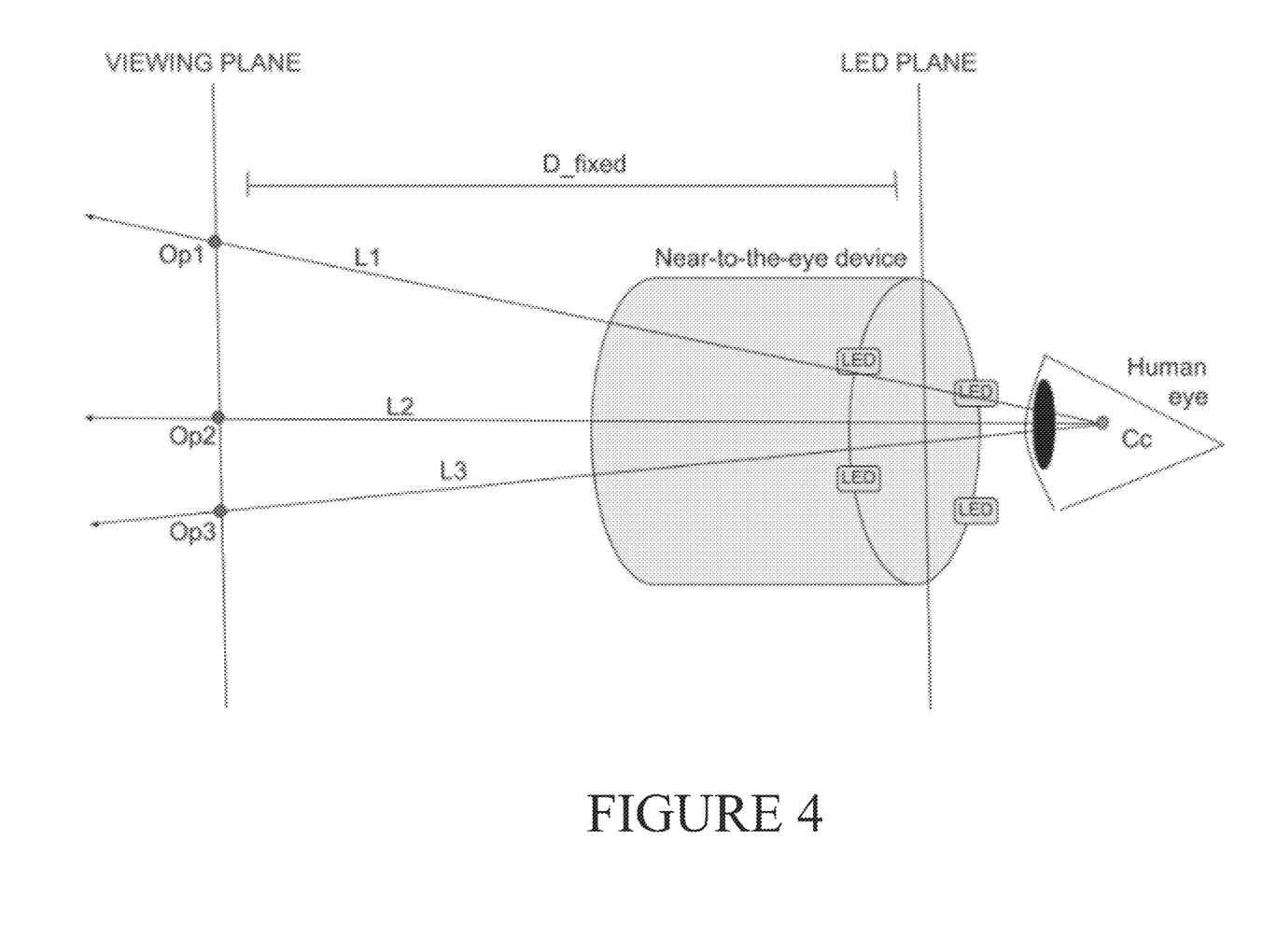
FIG. 4 illustrates an example method of determining a gaze distance.

FIG. 4 illustrates an example of gaze distance estimation. A LED plane is fitted into LEDs by minimizing distances between the LEDs and the plane. To estimate the gaze distance, the location of this plane is mathematically varied such that the plane is moved away from the eye by a distance D fixed in a direction which is orthogonal to the LED plane when it is fitted to the LED elements. This results in the plane at the viewing plane location illustrated in FIG. 4. The distance D fixed may be guessed, or it may be estimated during user calibration, or it may be known based on prior knowledge. The optical point, Op, is defined as the intersection between the vector (Cc+dL) and the viewing plane. Illustrated are three possible optical vectors and the corresponding optical points Op1, Op2 and Op3.

Once the three coordinates of the reference point are determined, the 3D reference point may be mapped in a second phase of the overall two-phase process into the two-dimensional scene camera coordinate system to obtain the gaze point, Gp, using the user's calibration matrix K:

$$Gp=K*Op$$

Calibration matrix K may be determined by conducting a calibration procedure with the user. The user fixates several target points with her gaze. The number of target points may be at least three or more than three. The target points should for ideal operation not be in a linear arrangement, for example they may form a grid of target points which avoids the linear arrangement of the target points being disposed on a straight line. For each target point, a calibration sample is collected from the eye-tracking camera which constitutes an annotated target point, Gp truth, and the optical point. These calibration samples taken together form a matrix equation from which the calibration matrix K can be solved. A calibration reference point in the three-dimensional space where the optical point will be determined corresponds to each of the target points. The larger the number of target points and samples, the better will be the expected accuracy of gaze tracking based on the calibration matrix. While a calibration matrix is discussed herein, more generally calibration information may be used.

Overall, the procedure may be characterized as obtaining first and second eye features from a two-dimensional pixel scene of the eye-tracking camera. Examples of the first and second eye features include the corneal centre and pupil centre. From locations of the first and second eye features in 3D space the reference point in a three-dimensional coordinate system is determined, and from the reference point the gaze point in a two-dimensional scene camera view is obtained. The coordinates of the gaze point may be determined, in the coordinate system of the scene camera, even in the event the gaze point is outside the view of the scene camera.

The obtaining of the corneal centre and pupil centre from the output of the eye-tracking camera may be performed, for example, using the physical eye model described in Hennessey, Craig, Borna Noureddin, and Peter Lawrence. 2006. "A Single Camera Eye-Gaze Tracking System with Free Head Motion." In Proceedings of the 2006 Symposium on Eye Tracking Research & Applications, 87-94. ACM. Alternatively, a neural network-based method may be used where the neural network is trained to output the optical vector when given an eye-tracking camera image as input.

At least some embodiments of the herein described gaze tracking process are beneficial and advantageous in that the reference point is determined based on the 3D characteristics of the eye, wherefore its location is to a degree invariant to small movements of the head. Further, alternatively or in addition, the gaze point may be determined also where it is disposed outside the view of the scene camera.

Figure 1B:
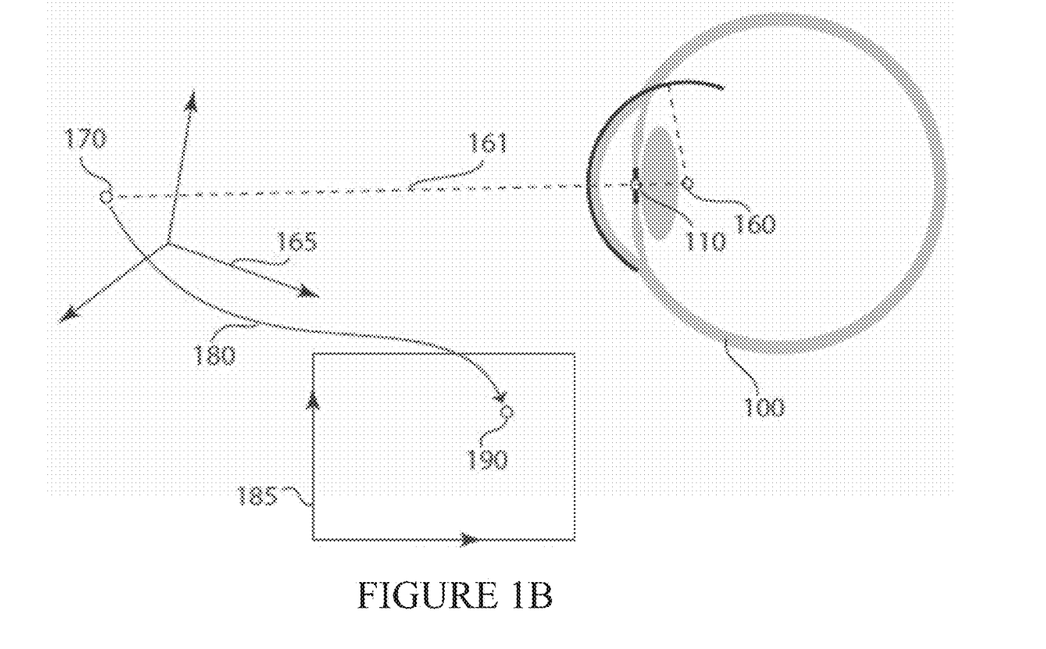
FIG. 1B illustrates coordinate mapping in accordance with at least some embodiments of the present invention.

FIG. 1B illustrates coordinate mapping in accordance with at least some embodiments of the present invention. Eye 100 is disposed on the left, with pupil 110 and the corneal centre 160 marked thereon. The optical vector multiplied by the gaze distance, d*L, is denoted as element 161, pointing to the reference point 170.

Reference point 170 is located in three-dimensional coordinate system, 165. A mapping 180 from coordinate system 165 to two-dimensional coordinate system 185 of the scene camera is denoted as mapping 180 in FIG. 1B. The mapping associates reference point 170 to gaze point 190 in the coordinate system 185 of the scene camera.

For example, in terms of a practical implementation, the ocular part(s) of a microscope may be supplemented with a module comprising the eye-tracking camera, suitable circuitry, and at least one light source for structured light, such as infrared light emitting elements. If the microscope contains an ocular part for both eyes, both ocular parts may be provided with a similar module. In that case, the estimated gaze point may be determined as a weighted combination of separately determined left and right eye gaze points, weights being assigned score values of the estimation. The microscope may also contain a scene camera that views the sample and sees at least part of the view the user sees. A light path to the scene camera can be directed through a beam splitter which directs the same view to the user and to the scene camera, with different optical elements.

The cameras may be connected into a computer using suitable interfaces, such as universal serial bus, USB, connectors, or integrated electrical leads. The computer may be furnished with a computer program which reads the camera streams and estimates the gaze point in the scene camera coordinates, as is depicted in FIG. 1B. The computer program may be equipped with a graphical user interface which, for example, may be configured to show the scene camera view with a superimposed estimated gaze point. The computer program may also be configured to run the configuration process with the user to determine the calibration matrix K.

While described herein in terms of utilizing pupil and glint locations and a physical eye model, the optical point may alternatively be determined by other means than with a physical eye model. For example, machine learning approaches based on deep convolutional networks can be taught to automatically translate pupil and glint locations into gaze points and/or gaze directions. Where the ocular device used is a gun sight, for example, the two-dimensional output of the scene camera corresponds to plural gaze directions where the user is gazing.

Figure 2:
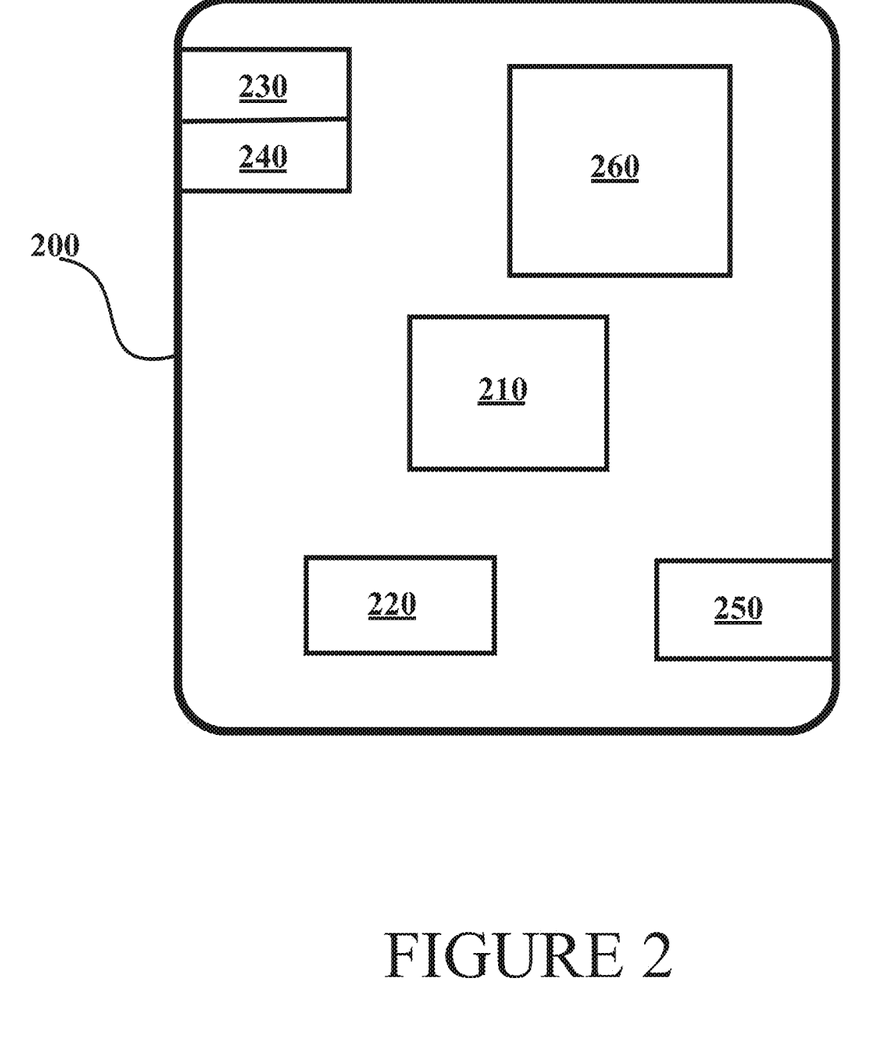
FIG. 2 illustrates an example apparatus capable of supporting at least some embodiments of the present invention.

FIG. 2 illustrates an example apparatus capable of supporting at least some embodiments of the present invention. Illustrated is device 200, which may comprise, for example, a gaze tracking module for an ocular device. Comprised in device 200 is processor 210, which may comprise, for example, a single- or multi-core processor wherein a single-core processor comprises one processing core and a multi-core processor comprises more than one processing core. Processor 210 may comprise, in general, a control device. Processor 210 may comprise more than one processor. Processor 210 may be a control device. A processing core may comprise, for example, a Cortex-A8 processing core manufactured by ARM Holdings or a Steamroller processing core designed by Advanced Micro Devices Corporation. Processor 210 may comprise at least one Qualcomm Snapdragon and/or Intel Atom processor. Processor 210 may comprise at least one application-specific integrated circuit, ASIC. Processor 210 may comprise at least one field-programmable gate array, FPGA. Processor 210 may be means for performing method steps in device 200, such as determining a reference point and performing a mapping. Processor 210 may be configured, at least in part by computer instructions, to perform actions.

Device 200 may comprise memory 220. Memory 220 may comprise random-access memory and/or permanent memory. Memory 220 may comprise at least one RAM chip. Memory 220 may comprise solid-state, magnetic, optical and/or holographic memory, for example. Memory 220 may be at least in part accessible to processor 210. Memory 220 may be at least in part comprised in processor 210. Memory 220 may be means for storing information. Memory 220 may comprise computer instructions that processor 210 is configured to execute. When computer instructions configured to cause processor 210 to perform certain actions are stored in memory 220, and device 200 overall is configured to run under the direction of processor 210 using computer instructions from memory 220, processor 210 and/or its at least one processing core may be considered to be configured to perform said certain actions. Memory 220 may be at least in part comprised in processor 210. Memory 220 may be at least in part external to device 200 but accessible to device 200.

Device 200 may comprise a transmitter 230. Device 200 may comprise a receiver 240. Transmitter 230 and receiver 240 may be configured to transmit and receive, respectively, information in accordance with at least one communication standard. Transmitter 230 may comprise more than one transmitter. Receiver 240 may comprise more than one receiver. Transmitter 230 and/or receiver 240 may be configured to operate in accordance with global system for mobile communication, GSM, wideband code division multiple access, WCDMA, 5G, long term evolution, LTE, IS-95, wireless local area network, WLAN, USB, Ethernet and/or worldwide interoperability for microwave access, WiMAX, standards, for example.

Device 200 may comprise a near-field communication, NFC, transceiver 250. NFC transceiver 250 may support at least one NFC technology, such as NFC, Bluetooth, Wibree or similar technologies.

Device 200 may comprise user interface, UI, 260. UI 260 may comprise at least one of a display, a keyboard, a touchscreen, a vibrator arranged to signal to a user by causing device 200 to vibrate, a speaker and a microphone. A user may be able to operate device 200 via UI 260, for example to perform a calibration process and/or gaze tracking operations.

Processor 210 may be furnished with a transmitter arranged to output information from processor 210, via electrical leads internal to device 200, to other devices comprised in device 200. Such a transmitter may comprise a serial bus transmitter arranged to, for example, output information via at least one electrical lead to memory 220 for storage therein. Alternatively to a serial bus, the transmitter may comprise a parallel bus transmitter. Likewise processor 210 may comprise a receiver arranged to receive information in processor 210, via electrical leads internal to device 200, from other devices comprised in device 200. Such a receiver may comprise a serial bus receiver arranged to, for example, receive information via at least one electrical lead from receiver 240 for processing in processor 210. Alternatively to a serial bus, the receiver may comprise a parallel bus receiver.

Figure 3:
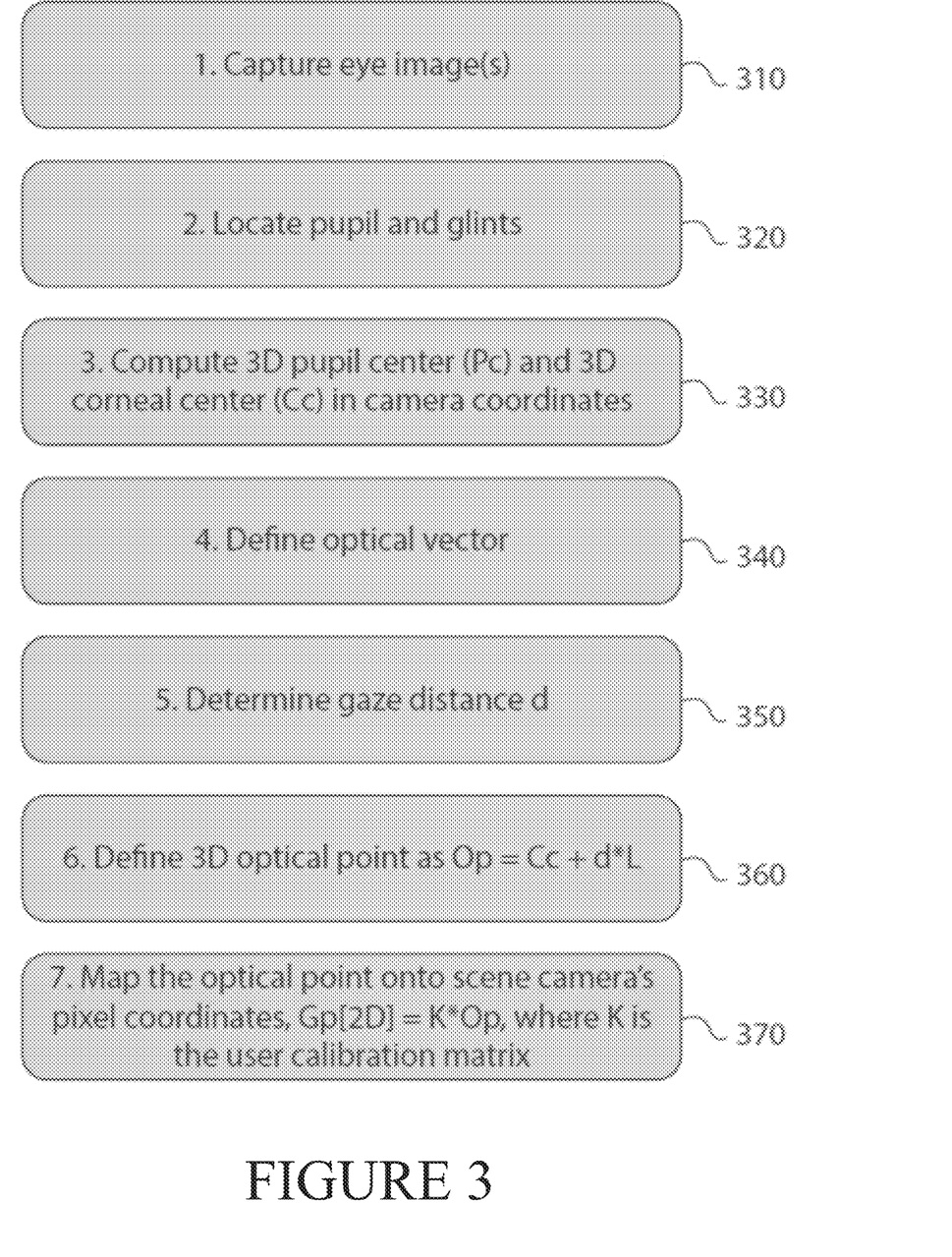
FIG. 3 is a flow graph of a method in accordance with at least some embodiments of the present invention.

Device 200 may comprise further devices not illustrated in FIG. 3. Device 200 may comprise a fingerprint sensor arranged to authenticate, at least in part, a user of device 200. In some embodiments, device 200 lacks at least one device described above. For example, some devices 200 may lack the NFC transceiver 250 and/or at least one other unit described herein.

Processor 210, memory 220, transmitter 230, receiver 240, NFC transceiver 250, and/or UI 260 may be interconnected by electrical leads internal to device 200 in a multitude of different ways. For example, each of the aforementioned devices may be separately connected to a master bus internal to device 200, to allow for the devices to exchange information. However, as the skilled person will appreciate, this is only one example and depending on the embodiment various ways of interconnecting at least two of the aforementioned devices may be selected without departing from the scope of the present invention.

FIG. 3 is a flow graph of a method in accordance with at least some embodiments of the present invention. The phases of the illustrated method may be performed in device 200, an auxiliary device or a personal computer, for example, or in a control device configured to control the functioning thereof, when installed therein.

In phase 310, at least one eye image is obtained from the eye-tracking camera. In phase 320, the pupil and glints of guide lights are located in the at least one eye image. In phase 330, a 3D pupil centre, Pc, and 3D corneal centre, Cc, of the user are determined based on the pupil and glints, for example with the assistance of a model of the physical shape of the eye. In phase 340, the optical vector L is determined, as described herein above. In phase 350, the gaze distance is determined.

In phase 360, the three-dimensional reference point, also known as the optical point, Op, is determined as $Op=Cc+d*L$. Finally, in phase 370, the gaze point, Gp, is obtained by mapping the optical point into the two-dimensional scene camera view using the calibration matrix K: $Gp=K*Op$. The gaze point is the point on the plate 140 the user is looking at.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in tracking user gaze in ocular devices.

ACRONYMS LIST 2D two-dimensional
3D three-dimensional
CCD charge-coupled device
CMOS complementary metal-oxide-semiconductor
USB universal serial bus

REFERENCE SIGNS LIST

| | |
|---|---|
| 100 | Eye |
| 110 | Pupil |
| 120 | Microscope |
| 130 | Optical equipment |
| 140 | Plate |
| 150 | Gaze targets |
| 160 | Corneal centre |
| 161 | Vector d * L |
| 165 | Three-dimensional coordinate system |
| 170 | Optical point (reference point) |
| 180 | Mapping |
| 185 | Coordinate system of scene camera |
| 190 | Gaze point |

TECHNICAL CLAUSES

Clause 1. An apparatus comprising at least one processing core, at least one memory including computer program code, the at least one memory and the computer program code being configured to, with the at least one processing core, cause the apparatus at least to:
determine a reference point in a three-dimensional space based at least in part on locations of first and second features of a user's eye and on the user's gaze distance, and
perform a mapping of the reference point into a viewed scene of a near-to-eye optical device to obtain an estimated gaze point and/or gaze direction of the user who is using the near-to-eye optical device, the mapping being based at least in part on calibration information associated with the user.

Clause 2. The apparatus according to Clause 1, wherein the first and second features of the user's eye are a corneal centre and a pupil centre.

Clause 3. The apparatus according to Clause 1 or 2, wherein the apparatus is further configured to obtain the calibration information as a calibration matrix based on a calibration process wherein the user gazes at three or more target points in sequence and a separate calibration reference point in the three-dimensional space is determined for each target point used in the calibration.

Clause 4. The apparatus according to any of Clauses 1-3, wherein the apparatus is further configured to obtain the gaze distance by computing an intersection point between a predetermined virtual plane and a vector which traverses the first and second features of the user's eye.

Clause 5. The apparatus according to any of Clauses 1-4, wherein the near-to-eye optical device is a microscope, wherein apparatus is configured to obtain the gaze direction separately for each of the user's two eyes.

Clause 6. The apparatus according to any of Clauses 1-5, wherein the apparatus is comprised in the near-to-eye optical device.

The invention claimed is:

1. An apparatus comprising at least one processing core, at least one memory including computer program code, the at least one memory and the computer program code being configured to, with the at least one processing core, cause the apparatus at least to:
determine a reference point in a three-dimensional space based at least in part on locations of first and second features of a user's eye and on the user's gaze distance, and
perform a mapping of the reference point into a viewed scene of a near-to-eye optical device to obtain an estimated gaze point and/or gaze direction of the user who is using the near-to-eye optical device, the mapping being based at least in part on calibration information associated with the user,
wherein the near-to-eye optical device comprises an ocular device, and in that the apparatus is configured to obtain the gaze distance by computing an intersection point between a predetermined virtual plane, the virtual plane fitted to light guide locations, and a vector which traverses the first and second features of the user's eye.

2. The apparatus according to claim 1, wherein the first and second features of the user's eye are a corneal centre and a pupil centre.

3. The apparatus according to claim 1, wherein the apparatus is further configured to obtain the calibration information as a calibration matrix based on a calibration process wherein the user gazes at three or more target points in sequence and a separate calibration reference point in the three-dimensional space is determined for each target point used in the calibration.

4. The apparatus according to claim 1, wherein the near-to-eye optical device is a microscope, wherein the apparatus is configured to obtain the gaze direction separately for each of the user's two eyes.

5. The apparatus according to claim 1, wherein the apparatus is comprised in the near-to-eye optical device.

6. A method comprising:
determining a reference point in a three-dimensional space based at least in part on locations of first and second features of a user's eye and on the user's gaze distance, and
performing a mapping of the reference point into a viewed scene of a near-to-eye optical device to obtain an estimated gaze point and/or gaze direction of the user who is using the near-to-eye optical device, the mapping being based at least in part on calibration information associated with the user,
wherein the near-to-eye optical device comprising an ocular device, and by obtaining the gaze distance by computing an intersection point between a predetermined virtual plane, the virtual plane fitted to light guide locations, and a vector which traverses the first and second features of the user's eye.

7. The method according to claim 6, further comprising obtaining the calibration information as a calibration matrix based on a calibration process wherein the user gazes at three or more target points in sequence and a separate calibration reference point in the three-dimensional space is determined for each target point used in the calibration.

8. The method according to claim 6, wherein the near-to-eye optical device is a microscope, wherein the method further comprises obtaining the gaze direction separately for each of the user's two eyes.

9. The method according to claim 6, further comprising at least one of controlling a microscope based at least partly on the estimated gaze point and/or gaze direction of the user, and identifying the user based on the calibration information.

10. A non-transitory computer readable medium having stored thereon a set of computer readable instructions that, when executed by at least one processor, cause an apparatus to at least:
  determine a reference point in a three-dimensional space based at least in part on locations of first and second features of a user's eye and on the user's gaze distance, and
  perform a mapping of the reference point into a viewed scene of a near-to-eye optical device to obtain an estimated gaze point and/or gaze direction of the user using the near-to-eye optical device, the mapping being based at least in part on calibration information associated with the user,
wherein the near-to-eye optical device comprising an ocular device, and by the set of computer readable instructions being configured to cause the apparatus to obtain the gaze distance by computing an intersection point between a predetermined virtual plane, the virtual plane fitted to light guide locations, and a vector which traverses the first and second features of the user's eye.

* * * * *